(12) United States Patent
Osborne (10) Patent No.: US 10,092,813 B2
(45) Date of Patent: Oct. 9, 2018

(54) GOLF ACCESSORY AND SYSTEM INCLUDING SAME

(71) Applicant: Brendan Robert Osborne, New Farm (AU)

(72) Inventor: Brendan Robert Osborne, New Farm (AU)

(*) Notice: Subject to any disclaimer, the term of this patent is extended or adjusted under 35 U.S.C. 154(b) by 44 days.

(21) Appl. No.: 15/102,365

(22) PCT Filed: Dec. 5, 2014

(86) PCT No.: PCT/AU2014/050398
§ 371 (c)(1),
(2) Date: Jun. 7, 2016

(87) PCT Pub. No.: WO2015/085360
PCT Pub. Date: Jun. 18, 2015

(65) Prior Publication Data
US 2016/0310821 A1    Oct. 27, 2016

(30) Foreign Application Priority Data
Dec. 11, 2013    (AU) .................................. 2013904830

(51) Int. Cl.
*A63B 57/00*    (2015.01)
*A63B 71/06*    (2006.01)
(Continued)

(52) U.S. Cl.
CPC .......... *A63B 71/0669* (2013.01); *A63B 57/00* (2013.01); *A63B 60/46* (2015.10);
(Continued)

(58) Field of Classification Search
None
See application file for complete search history.

(56) References Cited

U.S. PATENT DOCUMENTS

| | | | |
|---|---|---|---|
| 2006/0178110 A1* | 8/2006 | Nurminen | A63B 24/0021 455/41.2 |
| 2008/0001745 A1* | 1/2008 | Yarsa | A63B 24/0084 340/572.1 |

(Continued)

FOREIGN PATENT DOCUMENTS

EP    2 243 523    10/2010

OTHER PUBLICATIONS

International Search Report dated Mar. 10, 2016 out of priority Application PCT/AU2014/050398 (5 pages).
(Continued)

*Primary Examiner* — Damon Pierce
(74) *Attorney, Agent, or Firm* — Barnes & Thornburg LLP; G. Peter Nichols (57) ABSTRACT

A golf playing statistics capture system is provided including a plurality of near field communication tags, each attached to a respective golf club within a golfer's set of clubs, an external electronic device operating statistics capture software, and a golf accessory including a near field communication reader mechanism, wireless communication device associated with the near field communication reader mechanism to receive information from the near field communication reader mechanism and transmit information to the external electronic device.

11 Claims, 5 Drawing Sheets

(51) Int. Cl.

| | | |
|---|---|---|
| *A63B 69/36* | (2006.01) | |
| *A63B 60/46* | (2015.01) | |
| *G09B 19/00* | (2006.01) | |
| *G01S 19/19* | (2010.01) | |
| *G06K 7/10* | (2006.01) | |
| *G08B 13/14* | (2006.01) | |
| *G06K 19/07* | (2006.01) | |
| *G06K 19/077* | (2006.01) | |
| *A63B 53/00* | (2015.01) | |

(52) U.S. Cl.
CPC ...... *A63B 69/3608* (2013.01); *A63B 69/3635* (2013.01); *G01S 19/19* (2013.01); *G06K 7/10009* (2013.01); *G06K 19/0723* (2013.01); *G06K 19/07762* (2013.01); *G08B 13/1427* (2013.01); *G08B 13/1436* (2013.01); *G09B 19/0038* (2013.01); *A63B 2053/005* (2013.01); *A63B 2069/3605* (2013.01); *A63B 2071/063* (2013.01); *A63B 2071/0625* (2013.01); *A63B 2071/0655* (2013.01); *A63B 2071/0661* (2013.01); *A63B 2220/12* (2013.01); *A63B 2220/17* (2013.01); *A63B 2220/20* (2013.01); *A63B 2225/15* (2013.01); *A63B 2225/50* (2013.01); *A63B 2225/54* (2013.01)

(56) References Cited

U.S. PATENT DOCUMENTS

2009/0017944 A1    1/2009    Savarese
2012/0035003 A1    2/2012    Moran

OTHER PUBLICATIONS

Written Opinion dated Mar. 10, 2016 out of priority Application PCT/AU2014/050398 (5 pages).

\* cited by examiner

GOLF ACCESSORY AND SYSTEM INCLUDING SAME

TECHNICAL FIELD

The present invention relates to electronic devices and systems for use in golf and particularly an electronic device and system allowing a player to keep track of playing statistics more easily. Also disclosed is a system and method of collecting and managing data relating to a game or practice for a game.

BACKGROUND ART

Existing golf software on golfing GPS devices and in software applications provided on tablets and smartphones have the function to track shots throughout a round of golf. This allows the user to keep score and track shot distances by taking GPS coordinates before every shot.

They also have the function to notify a user how far they are away from the green or tee of the hole they are playing on. In some cases they can recommend a club type for the next shot, if a user has the information entered into their particular device or software.

One problem lies within the need to take the device out of the user's bag/pocket and manually initiate these features. For instance, to track shot distances the user must press a button on the device user interface before taking every shot. This can be around 100 shots per round for amateur players. This system is too intrusive.

It will be clearly understood that, if a prior art publication is referred to herein, this reference does not constitute an admission that the publication forms part of the common general knowledge in the art in Australia or in any other country.

SUMMARY OF INVENTION

The present invention is directed to a golf accessory and system including same, which may at least partially overcome at least one of the abovementioned disadvantages or provide the consumer with a useful or commercial choice.

With the foregoing in view, the present invention in one form, resides broadly in a golf accessory including a housing having at least one near field communication reader mechanism, wireless communication device associated with the near field communication reader mechanism to receive information from the near field communication reader mechanism and transmit information to an external electronic device, at least one input button externally accessible on the housing and associated with the wireless communication device, a power source to power the near field communication reader mechanism and the wireless communication device such that when powered, the near field communication reader mechanism reads a near field communication tag attached to a golf club determining the type of the golf club and transmits that information to the external electronic device and the at least one input button can be used to manually transmit additional stroke information to the external electronic device to account for penalty strokes taken.

In an alternative form, the present invention resides in a golf playing statistics capture system including a plurality of near field communication tags, each attached to a respective golf club within a golfer's set of clubs, an external electronic device operating statistics capture software, and a golf accessory including a housing having at least one near field communication reader mechanism wireless communication device associated with the near field communication reader mechanism to receive information from the near field communication reader in mechanism and transmit information to the external electronic device, at least one input button externally accessible on the housing and associated with the wireless communication device, a power source to power the near field communication reader mechanism and the wireless communication device such that when powered, the near field communication reader mechanism reads the near field communication tag attached to a golf club determining the type of the golf club used by the golfer for each stroke and transmits that information to the statistics capture software operating on the external electronic device and the at least one input button can be used to manually transmit additional stroke information to the statistics capture software operating on the external electronic device to account for penalty strokes taken.

The system of the present invention is preferably adapted to capture playing statistics in real time for either concurrent or later review and/or analysis. In particular, the system may be adapted to capture distance either to or from any object during gameplay, distance that the ball has travelled for each shot, with each club, the direction of the shot or ball, the number of strokes, the number of penalty strokes and the like, in order to allow the golfer to analyse his or her play.

The system of the present invention is particularly directed toward allowing a golfer to input or capture not only the total number of strokes, but also to identify with which club the strokes, preferably each stroke, was actually taken.

Each club of a golfer will typically be identified within the system using near field communication tags. The advantage of using near field communication tag is the tight range within which near field communication operates, typically within only approximately 5 cm. The NFC specification of RFID utilizes 13.56 mhz for close proximity (within 5 cm) tag scans. This will preferably minimise the chance that a golfer may scan the wrong tag accidentally and thereby capture incorrect information.

There is typically a setup process whereby each tag is specifically attached to a club in golfer's set and is then enabled. During the enabling process or the setup process, the identity of each club is preferably associated with each near field communication tag in order to identify the club thereafter. This may be automatic, in other words, the near field communication tags may come pre-coded for attachment to specific clubs or alternatively, a golfer may set this during the enabling or setup phase.

Normally, NFC tags placed on metal will not work due to interference from the metal. Anti-metal NFC tags have a special isolation layer allowing them to work on metal, such as may be found in the (normally) metal shaft of a golf club. Another option is to use a cut down version of an NFC bracelet which could fit on the shaft of the club. In a preferred configuration, the tag may be located on the butt of the grip of the club to allow a user to juxtaposition the tag close to the golf accessory more easily.

Preferably, a user will be provided with bundled NFC tags. They will attach each tag to one of their golf clubs. The tags can be, either be pre-programmed with the club name (such as "7 Iron" or "Driver") or in another option the user can identify each club to the corresponding tag through software on their electronic device. For instance the user may scan a tag and the software may prompt the user to set the club type, or number or loft. This will set the club type to the tag ID.

The system of the present invention includes an external electronic device operating statistics capture software. The external electronic device could be a tablet or smart phone for example or alternatively, could be an existing golf device which is capable of using the information captured by the golf accessory of the present invention, rather than requiring user input or manipulation to record statistics.

Devices such as tablets or smartphones in particular are normally carried with the user but not on their person. This will normally allow separation of the user from the external electronic device.

Each external electronic device used in the present invention will normally include a processor with memory for storing and following instructions as well as a display upon which the processor can cause interfaces to be generated showing statistics. In normal use, the external electronic device will preferably receive information from the golf accessory and provides that information to the statistics capture software operating on the external electronic device.

The software will normally be a software application and it may be an application which has adapted functionality from a currently available software application, or a bespoke software application may be provided. The software application will preferably allow capture, analysis and display of information and statistics based on the information which is captured. Importantly, the software is able to give statistics on distances of any particular stroke taken and the club used to take that stroke.

The system of the present invention preferably uses a location device provided as a part of the external electronic device for distance and location information, it is particularly preferred that the golf accessory used in the present invention does not have location functionality in order to minimise the size of the golf accessory.

The system of the present invention includes a golf accessory including a housing. The golf accessory of the present invention is preferably designed to be worn by a user but worn remotely from the user's hands or wrists as these areas are often near golf clubs and may accidentally cause scanning of a near field communication tag incorrectly or unwittingly. Therefore, according to a particularly preferred embodiment, the golf accessory is designed to be attached to the user's belt. It is designed to be as small as possible so that it is not intrusive in the user's movement.

In other embodiments, such as an embodiment where the golf accessory has an energising button, as will be explained further below, then the golf accessory may be worn by user on or near the hand or wrist.

The housing of the golf accessory of the preferred embodiment is typically quite small. The housing is normally a multipart housing, preferably made from two or more housing sections or portions which are releasably attachable relative to one another. A clamshell embodiment is particularly preferred.

The housing will preferably be generally rectangular. The housing is preferably weatherproof and therefore, materials such as plastics are preferred. The housing is specifically adapted to enclose components of the golf accessory within the housing. One or more ports or similar openings may be provided in order to allow attachment of external devices thereto, for example cables or cords. Where provided, these ports will normally be capable of sealing, normally with a removable cover, to prevent ingress of dust or water or the like.

As will be explained further below, the housing is typically provided with one or more buttons, in one or more of the housing walls. The buttons provided are typically movable, and preferably depressible. According to a particularly preferred embodiment, three buttons will be provided, two buttons provided in a sidewall of the housing, namely a "drop" button and an "reset" button (or a "distance" button) and an "energise" button provided on an outer or face wall of the housing.

Where provided, it is preferred that the buttons are also weatherproof in order to minimise or prevent ingress of dust or water or the like through the buttons. The buttons will normally communicate with switches or other input devices within the housing in order to provide input or instructions.

It is preferred that the golf accessory he provided with a belt clip in order to allow attachment to a golfer's belt or other clothing The preferred belt clip will be resilient and is normally biased to hold the belt or other clothing, even during a golfer's swing or against accidental contact.

The golf accessory which is a part of the system of the present invention includes at least one near field communication reader mechanism. Preferably, a reader device with an associated antenna is provided. Preferably, the antenna will be used to energise the near field communication tag in order to collect information therefrom.

It is particularly preferred that an externally mounted actuator, normally a button or similar is provided on the housing to allow powering up or energising of the near field communication reader mechanism as required by the user. Preferably, the user will energise the near field communication reader mechanism as required in order to scan a tag and the reader will preferably power down afterward in order to preserve battery power or to use less power. According to a particularly preferred embodiment an enlarged energising button occupying a majority of a forward or outwardly facing surface of the housing is provided.

In a preferred configuration, the energising button may be triggered by pressing the club/tag against the button. As long as the club is pressing the energising button, the device may be powered up. When the user moves the club away, the device may power down again.

The reader mechanism communicates with the wireless communication device preferably in order to pass information captured by the reader mechanism from the near field communication tag, to the wireless communication device. Any type of near field communication reader mechanism can be provided. It is preferred that the reader mechanism is powered by an on-board power supply.

Preferably, a feedback mechanism is provided on the golf accessory to provide audible and/or tactile feedback of a successful tag scan/button push. A vibration motor/buzzer or speaker could be used to notify the user of a successful tag scan/button push. This is more likely to be used in cases where the user decides to leave their phone in their bag/buggy/cart. The vibrator/buzzer/speaker could be turned on and off via the smartphone software.

The golf accessory which is a part of the system of the present invention also includes a wireless communication device. The wireless communication device preferably receives information from the near field communication reader mechanism and transmits information to the external electronic device. Preferably, the wireless communication device is relatively simple and any type of device or communication pathway can be used. A particularly preferred form of the device is a Bluetooth low energy device or similar in order to allow the golf accessory to have synced communication with the external electronic device.

Once the golf accessory is synced to the external electronic device, the devices may automatically re-establish the synced communication at every start-up, or when in range with one another. The wireless communication device may power down with the near field communication reader mechanism in order to conserve power. The wireless communication device may power up or energise through the same configuration as the near field communication reader mechanism. In particular, the external energise button may be used to energise both the near field communication reader mechanism and the wireless communication device if required. Alternatively, the wireless communication device may be active when the golf accessory is powered or turned on.

The wireless communication device is also typically used to receive and transmit information from other components within the housing of the golf accessory. It is typically the primary external communications pathway. Secondary communications pathways such as wired pathways may be provided through a USB connection or the like.

The golf accessory which is a part of the system of the present invention also includes at least one input button externally accessible on the housing and associated with the wireless communications device. According to a particularly preferred embodiment, a pair of input buttons are provided as well as an energising button. The pair of input buttons are typically provided to allow information input into the golf accessory and communication to the wireless communication device. Preferably, one button will be provided to allow a user to manually enter penalty strokes taken and the second button will typically allow the user to reset the accessory in case of incorrect entry of information, either manually or from scanning the wrong NFC tag for example preferably, the reset button will only reset to immediately prior to the last action taken. Therefore, a single press of the reset button will reset to prior to the most recent action and user will typically press the reset button again to reset to the action before that and the like. Alternatively, one or more of the buttons could be configured so that a long, press (of a couple of seconds for example) will preferably perform another action. It might be configured that a normal press will prompt the software application to speak the distance to pin and a long press (holding the button in for 1-2 seconds) could prompt it to speak the distance to pin and recommend a club for example.

The at least one input button provides input to the wireless communication device which can then be communicated to the external electronic device for recording. Typically, the input buttons are on the side of the housing of the golf accessory. The input button may be recessed below the level of the housing in order to prevent accidental activation of the input buttons.

As mentioned above, the energising button is typically provided on the front or outward surface of the housing of the golf accessory in order to allow easy access thereto.

The golf accessory which is a part of the present invention also preferably includes a power source. Any type of power source may be used. A particularly preferred power source is one or more on-board batteries. The one or more on-board batteries may be rechargeable or replaceable. Preferably, if rechargeable, then a battery charger will be provided in the golf accessory.

A user may be required to attach a charging cable or similar in order to charge an on-board rechargeable battery. Such a charging cable is preferably a USB charging cable allowing information transfer and updates to be passed to the golf accessory. Alternatively, an induction charging mechanism can be included.

The golf accessory will also preferably include one or more status indicators. In particular, a battery status or charge remaining indicator will normally be provided. A battery charging status indicator will also normally be provided.

The golf accessory included in the present invention also typically have an on/off switch in order to turn the golf accessory itself on and off. This is in addition to the preferred energising button which will allow the user to energise the near field, communication reader and/or wireless communication device as required in order to conserve power.

The golf accessory may be provided with a button which will allow the user to press when they require information such as the distance to the pin/green or club recommendation. This may be transmitted to the external electronic device and the result may be displayed or audibly emitted by the external electronic device, preferably in a voice format The battery status can also be sent via the Bluetooth low energy to the external electronic device.

The important technology in this invention is the use of a RFID (NFC) reader and. Bluetooth low energy communications device. This allows the device and system of the present invention to operate for long periods of time but minimise power usage. This also allows the external electronic device to operate Bluetooth low energy to connect to the golf accessory whereas previous specifications of Bluetooth would have drained the external electronic device battery far more significantly, during a round of golf. The system preferably utilizes the user's external electronic device GPS, significantly reducing complexity and cost.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present invention, a system for keeping track of statistics in golf utilising a golf accessory, in other words, a golf playing statistics capture system is provided.

According to a particularly preferred embodiment of the present invention, the golf playing statistics capture system includes three main elements, namely a plurality of near field communication tags 11, each attached to a respective golf club 10 within a golfer's set of clubs, an external electronic device, normally a smartphone 12 operating golf statistics capture software, and a golf accessory 13 used to capture information from the near field communication tags 11 and communicate with the statistics capture software operating on the smartphone 12. This system is illustrated schematically in FIG. 1.

Figure 1:
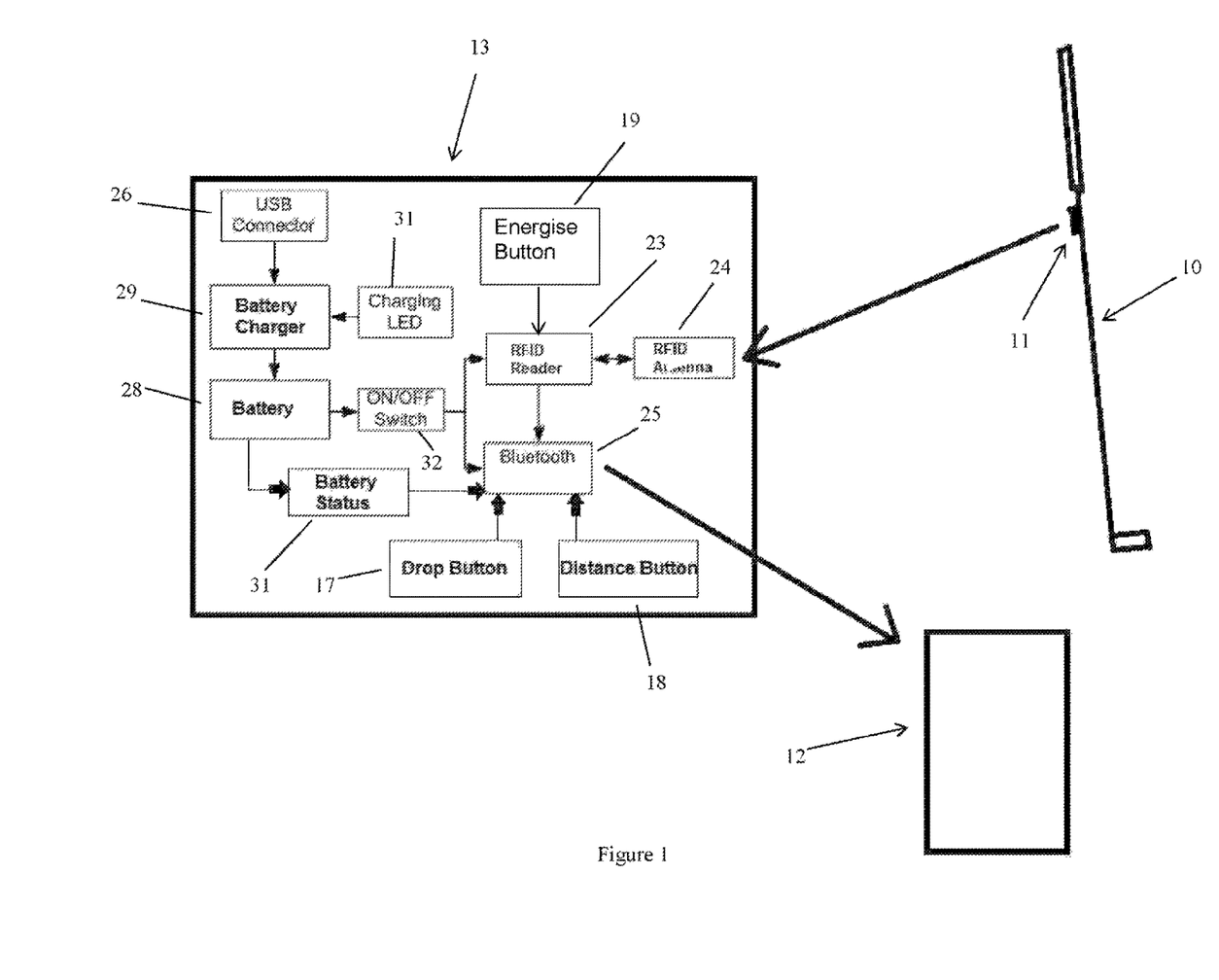
FIG. 1 is a schematic illustration of a system according to a particularly preferred embodiment of the present invention

The system of the present invention is adapted to capture playing statistics in real time for either concurrent or later review and/or analysis by a golfer. In particular, the system is adapted to capture information about the club used for each shot which in turn allows calculation of the distance that the ball has travelled for each shot, the number of strokes, the number of penalty strokes and the like in order to allow the golfer to analyse his or her play.

According to the preferred embodiment, each club 10 of a golfer is identified within the system using a near field communication (NFC) tag 11. The advantage of using near field communication tags is the tight range within which near field communication operates, typically within only approximately 5 cm. The NFC specification of RFID utilizes 13.56 mhz for close proximity (within 5 cm) tag scans.

Upon purchasing the system of the present invention, the user will undergo a setup process whereby each NFC tag 11 is specifically attached to a club 10 in golfer's set and is then enabled. During the enabling process or the setup process, the identity of each club 10 is associated with each NFC tag 11 in order to identify the club 10 thereafter. This may be automatic, in other words, the near field communication tags may come pre-coded for attachment to specific clubs or alternatively, a golfer may set this during the enabling or setup phase.

Normally, NFC tags placed on metal will not work due to interference from the metal. Anti-metal NFC tags have a special isolation layer allowing them to work on metal, such as may be found in the (normally) metal shaft of a golf dull Another option is to use a cut down version of an NFC bracelet which could fit on the shaft of the club.

Preferably, a user will be provided with bundled NFC tags. They will attach each tag to one of their golf clubs. The tags can be either be pre-programmed with the club name (such as "7 Iron" or "Driver") or in another option the user can identify each club to the corresponding tag through software on their electronic device. For instance the user may scan a tag and the software may prompt the user to set the club type. This will set the club type to the tag ID.

The preferred embodiment of the system includes an external electronic device, normally a smartphone 12 operating golf statistics capture software. The external electronic device could be an existing golf device which is capable of using the information captured by the golf accessory of the present invention rather than requiring user input or manipulation to record statistics which is usual for these devices if used as score recorder.

Each smartphone 12 includes a processor with memory for storing and following instructions as well as a display upon which the processor can cause interfaces to be generated showing statistics. In normal use, the smartphone 12 receives information from the golf accessory 13 and provides that information to the statistics capture software operating on the smartphone 12.

The software will normally be a software application and it may be an application which has adapted functionality from a currently available software application or a bespoke software application may be provided. The software application allows capture, analysis and display of information and statistics based on the information which is captured. Importantly, the software is able to give statistics on distances of any particular stroke taken and the club used to take that stroke.

The system preferably uses a location device provided as a part of the smartphone 12 for distance and location information. It is particularly preferred that the golf accessory 13 used in the present invention does not have location functionality in order to minimise the size of the golf accessory 13.

Figure 2:
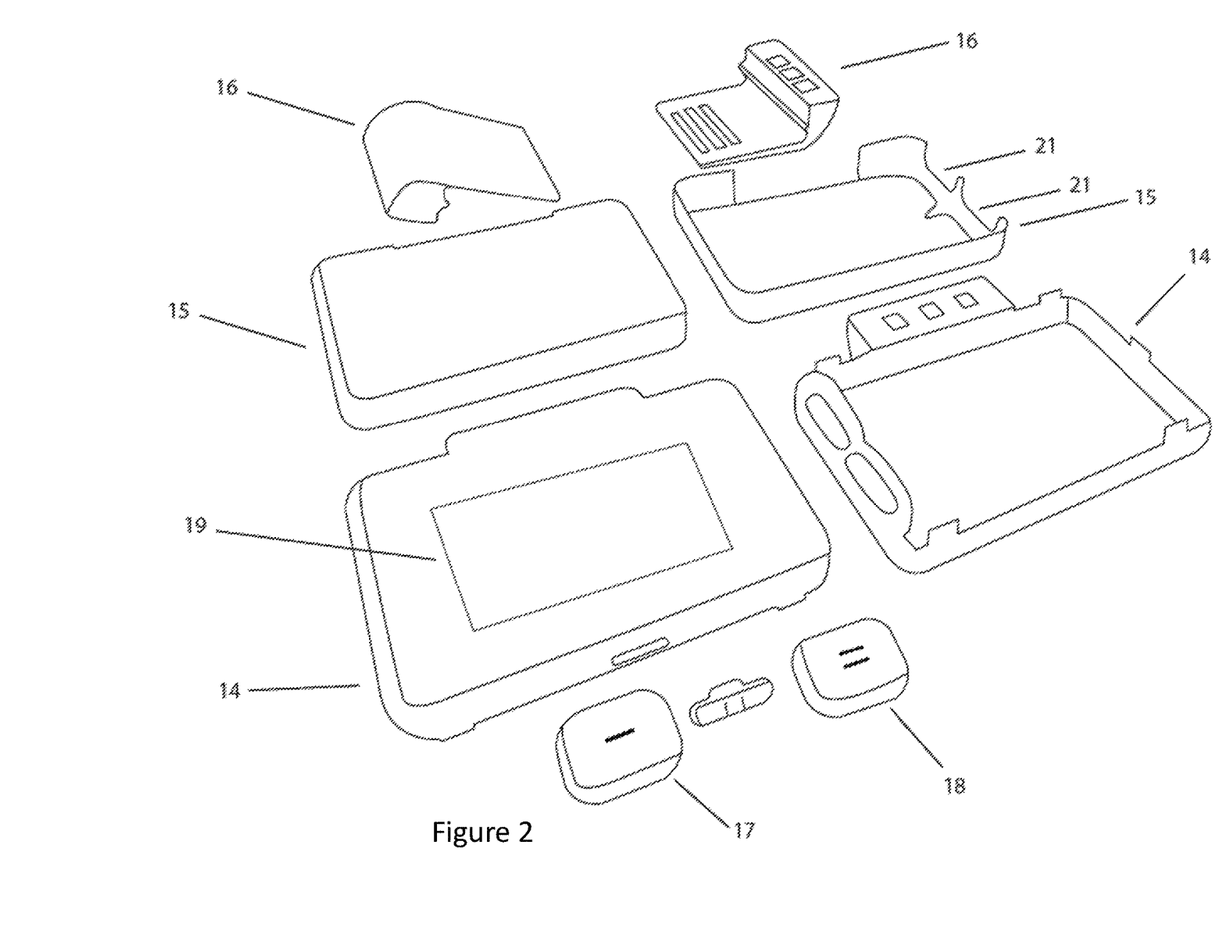
FIG. 2 is an isometric view of a pair of housings according o a particularly preferred embodiment of the present invention which have been disassembled.
Figure 3:
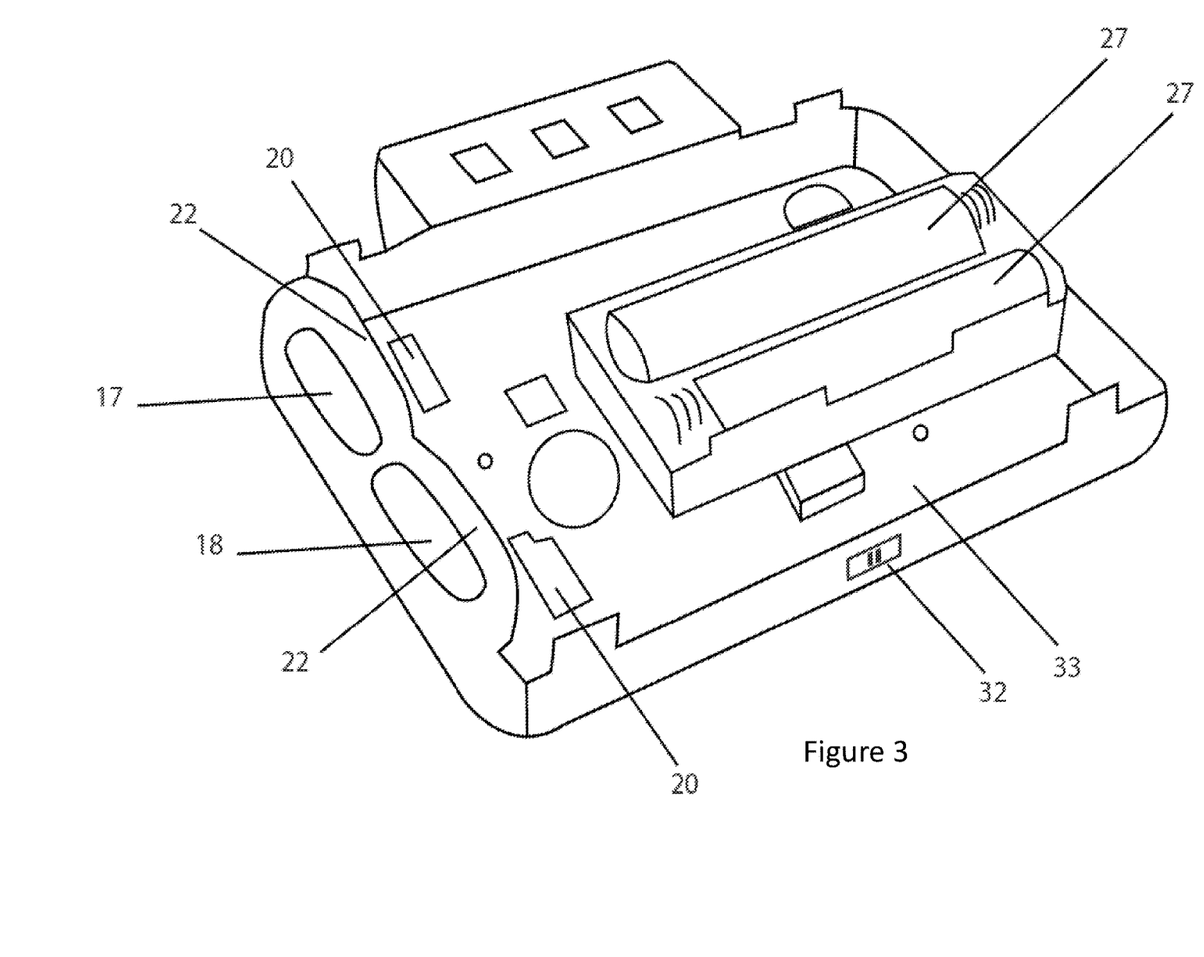
FIG. 3 is an isometric view of internal configuration of a golf accessory according to a preferred embodiment of the present invention.

The system of the present invention includes a golf accessory which is central to the functionality of the system. The golf accessory 13 of the preferred embodiment is illustrated in FIGS. 2 and 3 and the functionality is illustrated in FIG. 1.

The golf accessory 13 of the preferred embodiment includes a housing. The golf accessory of the preferred embodiment is designed to be worn by user attached to the user's belt It is designed to be as small as possible so that it is not intrusive in the user's movement.

The housing of the golf accessory of the preferred embodiment is typically quite small. The housing illustrated in FIG. 2 is a multipart housing, preferably made from two housing sections, a base housing portion 14 and a rear cover 15 which are releasably attachable relative to one another. A detachable belt clip 16 is also provided.

As illustrated, the housing is generally rectangular and weatherproof and therefore, materials such as plastics are preferred. The housing is specifically adapted to enclose components of the golf accessory 13 within the housing as illustrated in FIG. 3. One or more ports or similar openings may be provided in order to allow attachment of external devices thereto, for example, cables or cords. Where provided, these ports will normally be capable of sealing, normally with a removable cover, to prevent ingress of dust or water or the like.

As will be explained further below, the housing is provided with a pair of buttons 17, 18 in one of the housing walls. The buttons provided are movable, and depressible. According to a particularly preferred embodiment, three buttons will be provided, two buttons 17, 18 provided in a sidewall of the housing, namely a "drop" button 17 and a "distance" button 18 and an "energise" button 19 provided on an outer face wall of the housing as illustrated in FIG. 2.

It is preferred that the buttons are also weatherproof in order to minimise or prevent ingress of dust or water or the like through the buttons. The buttons will normally communicate with switches 20 within the housing in order to provide input or instructions As illustrated, the buttons 17, 18 fit into complementary cutouts 2 I in the housing parts and have an inner sealing flange 22.

The belt clip 16 is resilient and is normally biased to hold the belt or other clothing even during a golfer's swing or against accidental contact.

The golf accessory 13 includes a near field communication reader mechanism. As illustrated in FIG. 1, the reader mechanism includes a reader device 23 with an associated antenna 24 used to energise the near field communication tag 11 in order to collect information therefrom As outlined above, it is particularly preferred that an externally mounted energising button 19 is provided on the housing to allow powering up or energising of the near field communication reader mechanism as required by the user. Preferably, the user will energise the near field communication reader mechanism as required in order to scan a tag 11 and the reader will power down afterward in order to preserve battery power or to use less power. According to the illustrated embodiment, an enlarged energising button 19 occupying a majority of a forward or outwardly facing surface of the housing is provided.

The NFC reader device 23 with an associated antenna 24 communicates with a Bluetooth communication device 25 in order to pass information captured by the reader device 23 with an associated antenna 24 from the near field communication tag 11, to the Bluetooth communication device 25. It is preferred that the NFC reader device 23 with an associated antenna 24 is powered by an on-board power supply, The Bluetooth communication device 25 receives information from the near field communication NFC reader device 23 and transmits information to the smartphone 12. Preferably, the Bluetooth communication device 25 is a Bluetooth low energy device or similar in order to allow the golf accessory to have synced communication with the smartphone 12.

Once the golf accessory 13 is synced to the smartphone 12, the devices automatically re-establish the synced communication at every start-up, or when in range with one another. The Bluetooth communication device 25 may power down with the near field communication reader mechanism in order to conserve power. The Bluetooth communication device 25 may power up or energise through the same configuration as the near field communication reader mechanism. In particular, the external energise button 19 may be used to energise both the near field communication reader mechanism and the Bluetooth communication device 25 if required. Alternatively, the Bluetooth communication device 25 may be active when the golf accessory is powered or turned on.

The Bluetooth communication device 25 is also typically used to receive and transmit information from other components within the housing of the golf accessory 13. It is typically the primary external communications pathway. Secondary communications pathways such as wired pathways such as may be provided through a USB connection 26 which can also be used to provide power to the golf accessory 13.

According to an illustrated embodiment, a pair of input buttons 17, 18 is provided as well as an energising button 19. The pair of input buttons are typically provided to allow information input into the golf accessory 10 and communication to the Bluetooth communication device 25. In the preferred embodiment, a "drop" button 17 is provided to allow a user to manually enter penalty strokes taken and a "distance" button 18 allows the user to retrieve distance information from the associated smartphone 1 2 which is then normally audibly spoken by the smartphone using hardware of the smartphone 12.

The buttons 17, 18 provide input to the Bluetooth communication device 25 which can then be communicated to the smartphone for action. As illustrated in FIGS. 2 and 3 in particular, the input buttons 17, 18 are on the side of the housing of the golf accessory 13.

The golf accessory 13 which is a part of the present invention also preferably includes a power source and any type of power source may be used A particularly preferred power source is one or more on-board batteries 27 such as illustrated in FIG. 3. Alternatively, a rechargeable battery 28 can be provided, and a battery charger 29 is provided in the golf accessory 13.

A user may be required to attach a charging cable or similar in order to charge an on-board rechargeable battery. Such a charging cable is preferably a USB charging cable allowing information transfer and updates to be passed to the golf accessory. Alternatively, an induction charging mechanism can be included.

A battery status indicator 30 is preferably provided and a charging status indicator 31 is also provided The components of the golf accessory 13 illustrated schematically in FIG. 1 are normally provided on a PCB 33 within the housing with an on/off button 32 also provided to switch the accessory 13 on and off.

Before starting a round of golf a user would switch on the golf accessory 13 and place it on their belt. They will then launch their preferred golf app on their (Bluetooth Low Energy enabled) smartphone. The golf app will need to have pre-existing support added for the invention. The user will link their smartphone to the invention. They will start a round through the app and select the course they are playing on. The app will then listen for data on the Bluetooth Low Energy protocol. Preferably the user will place their smartphone in their pocket or on a clip on their belt so that GPS co-ordinates are close to the location of the ball. However the user could also place their smartphone in their golf bag/buggy/cart if they are using the invention to just record the shot count and not GPS positions.

Before taking each shot, the user will scan the golf club tag 11 on the invention. The NFC tag data will be sent to the smartphone via Bluetooth Low Energy. The application operating on the smartphone will recognise the data, mark a shot on the score card, record the users GPS location (if the user has activated this feature), and optionally trigger an audible alert that the tag scan was successful. The audible alert could be configured in the Smartphone app, In the situation where a user needs to take a drop, they will push the Drop button on the invention which will send a predefined notification to the Smartphone via Bluetooth Low Energy. The smartphone app will recognise this and mark a drop on the shot count, In the situation where a user requires the distance from their location to the green or pin, or a club recommendation, they will push the Distance button 18. This will send a notification to the smartphone 12 via Bluetooth Low Energy. The smartphone software application will recognise this and could audibly speak the distance to the pin or green and optionally recommend a club type.

Optionally there could be more buttons that could react in predefined ways set by the user in their smartphone software application. This could be of an informative nature such as audibly speaking what hole the user is on, the Par and recommendations on how to play the hole. It could speak the current shot count, time, time of play, weather or any other information that is available on the smartphone.

Figure 4:
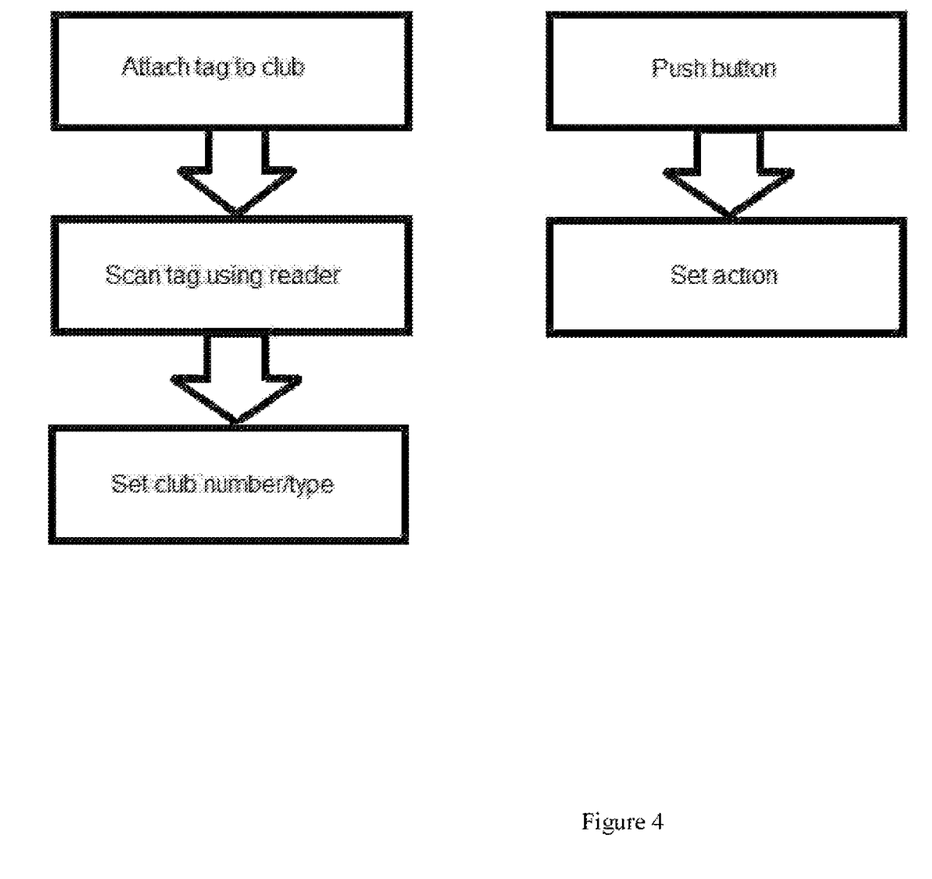
FIG. 4 is a flow chart illustration of a setup process used according to a preferred embodiment of the present invention
Figure 5:
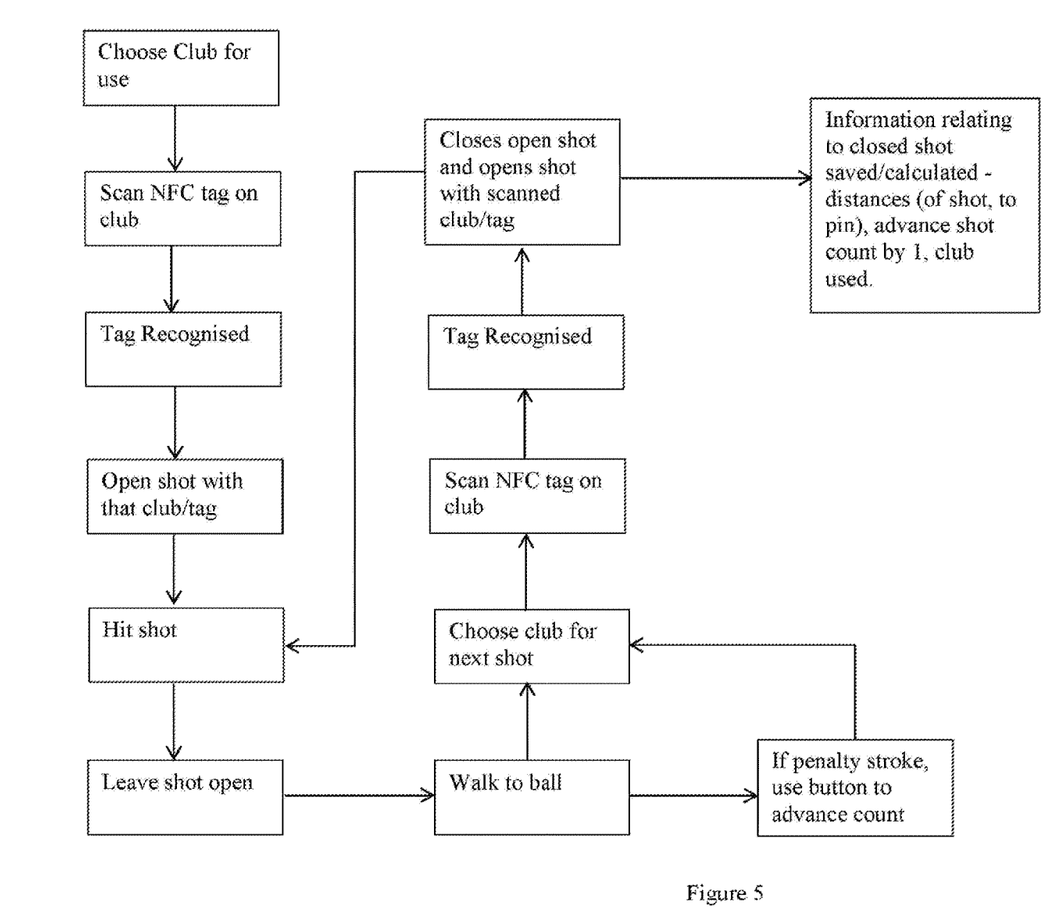
FIG. 5 is a flow chart illustration of playing process used according to a preferred embodiment of the present invention.

A preferred method of operation in relation to the setup of the system is illustrated in FIG. 4 and a preferred method of operation in relation to the use of the system is illustrated in. FIG. 5.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A golf accessory including a housing having at least one near field communication reader mechanism, a wireless communication device associated with the near field communication reader mechanism to receive information from the near field communication reader mechanism and to transmit information to an external electronic device, at least one input button externally accessible on the housing and associated with the wireless communication device, a power source to power the near field communication reader mechanism and the wireless communication device such that when powered, the near field communication reader mechanism reads a near field communication tag attached to a golf club determining a type of the golf club and transmits that information to the external electronic device, the at least one input button can be used to manually transmit additional stroke information to the external electronic device to account for penalty strokes taken and an energizing button provided on the housing to temporarily energize the near field communication reader mechanism as required by the user.

2. The golf accessory according to claim 1 wherein the at least one input button communicates with a switch within the housing in order to provide input or instructions.

3. The golf accessory according to claim 1 wherein the at least one near field communication reader mechanism includes a near field communication reader device with an associated antenna to energize the near field communication tag in order to collect information therefrom.

4. The golf accessory according to claim 1 wherein the wireless communication device is a Bluetooth low energy device.

5. The golf accessory according to claim 1 wherein the wireless communication device powers down with the near field communication reader mechanism in order to conserve power and is energized through the same energizing button as the near field communication reader mechanism.

6. The golf accessory according to claim 1 wherein a Universal Serial Bus (USB) is provided to allow charging of any onboard battery and information transfer to be passed to the golf accessory.

7. The golf accessory according to claim 1 wherein a distance input button is provided with a request transmitted to the external electronic device and distance information displayed or audibly emitted by the external electronic device as a result.

8. A golf playing statistics capture system including a plurality of near field communication tags, each attached to a respective golf club within a golfer's set of clubs, an external electronic device operating statistics capture software, and a golf accessory including a housing having at least one near field communication reader mechanism, wireless communication device associated with the near field communication reader mechanism to receive information from the near field communication reader mechanism and transmit information to the external electronic device, at least one input button externally accessible on the housing and associated with the wireless communication device, a power source to power the near field communication reader mechanism and the wireless communication device such that when powered, the near field communication reader mechanism reads the near field communication tag attached to a golf club determining a type of the golf club used by the golfer for each stroke and transmits that information to the statistics capture software operating on the external electronic device and the at least one input button can be used to manually transmit additional stroke information to the statistics capture software operating on the external electronic device to account for penalty strokes taken and an energizing button provided on the housing to temporarily energize the near field communication reader mechanism as required by the user.

9. A golf playing statistics capture system according to claim 8 including a setup process whereby each near field communication tag is attached to a club in golfer's set with the identity of each club associated with each near field communication tag in order to identify the club thereafter.

10. A golf playing statistics capture system according to claim 8 wherein each external electronic device includes a processor with memory for storing and following instructions as well as a display upon which the processor can cause interfaces to be generated showing statistics.

11. A golf playing statistics capture system according to claim 8 wherein a location device provided as a part of the external electronic device is used for distance and location information.

* * * * *